United States Patent Office 3,636,122
Patented Jan. 18, 1972

3,636,122
PREPARATION OF 1,4-HEXADIENE FROM ETHYL-
ENE AND BUTADIENE WITH SELECTED CY-
CLOPENTADIENYLRHODIUM CATALYSTS
Richard D. Cramer, Landenberg, Pa., and Richard V.
Lindsey, Jr., Hockessin, Del., assignors to E. I. du
Pont de Nemours and Company, Wilmington, Del.
No Drawing. Filed May 28, 1970, Ser. No. 41,538
Int. Cl. C07c 3/10
U.S. Cl. 260—680 B                          10 Claims

ABSTRACT OF THE DISCLOSURE 1,4-hexadiene is prepared by reaction between ethylene and butadiene in the presence of certain cyclopentadienyl-rhodium catalysts at a temperature of about 35–300° C.

BACKGROUND OF THE INVENTION

(1) Field of the invention

This invention relates to, and has as its principal object provision of, a new catalytic process for making 1,4-hexadiene, particularly valuable as a component of ethylene/propylene/1,4-hexadiene terpolymers, curable to useful elastomeric products (see Gresham and Hunt U.S. Pat. 2,933,480).

(2) Relationship to prior art

The formation of 1,4-hexadiene from ethylene and butadiene in the presence of selected hydrocarbonrhodium catalysts is described in Cramer U.S. Pat. 3,502,738. Some aspects of this process are discussed by Cramer in J. Am. Chem. Soc. 89, 1633 (1967). In the latter paper, it is stated (page 1634, column 2, footnote 11) that $$\pi\text{-}C_5H_5Rh(C_2H_4)_2$$

does not catalyze the process.

SUMMARY AND DETAILS OF THE INVENTION

It has now been found that, contrary to the Cramer article mentioned above, at temperatures significantly above 30° C., i.e., at least about 35° C., $\pi\text{-}C_5H_5Rh(C_2H_4)_2$ and related compounds do catalyze the reaction of ethylene and butadiene to give 1,4-hexadiene.

The new process consists in reacting ethylene and butadiene in the presence of a hydrohalic acid and a catalytic amount of a complex rhodium(I) compound of the formula (1) $\pi\text{-}RC_5H_4RhA^1A^2$ wherein:
R is hydrogen, lower alkyl (of up to 6 carbons), or phenyl;
Rh is rhodium(I); and
$A^1$ and $A^2$ are molecules and may be (1), taken separately and alike or different, ethylene, propylene, vinyl fluoride, vinyl chloride, vinyl lower-alkanoate, allyl lower-alkanoate, vinyl lower-alkyl ether, styrene, lower-alkyl acrylate, or acrylonitrile, each molecule being coordinated to rhodium through its carbon-carbon double bond, or (2), taken together, 1,5-hexadiene or 1,5-cyclooctadiene, each molecule being coordinated to rhodium through both double bonds.

Examples of lower alkyl groups that can be values of R are methyl, ethyl, isopropyl, t-pentyl, and hexyl. Because of availability, R is preferably hydrogen or methyl, especially hydrogen.

Examples of vinyl lower-alkanoates (symbol $A^1$ and $A^2$) are vinyl acetate, vinyl isobutyrate, vinyl trimethylacetate, and vinyl hexanote. Examples of allyl lower-alkanoates are allyl acetate, allyl propionate, and allyl isovalerate. Examples of vinyl lower-alkyl ethers are vinyl ethyl ether, vinyl isopropyl ether, vinyl t-butyl ether, and vinyl isohexyl ether. Examples of lower-alkyl acrylates are ethyl acrylate, isopropyl acrylate, and t-butyl acrylate.

DESCRIPTIONS AND SYNTHESES OF THE CATALYST COMPOUNDS $\pi\text{-}C_5H_5Rh(C_2H_4)_2$, the compound of Formula 1 wherein R is hydrogen and $A^1$ and $A^2$ are ethylene, can be prepared by the method of King, Inorg. Chem., 2, 528 (1963). Related compounds in which R is other than hydrogen can be prepared by substituting the appropriate R-substituted cyclopentadiene for cyclopentadiene itself.

Compounds of Formula 1 in which A's are other than ethylene can be prepared by a two-step process. The starting material is 2,4-pentanedionatodiethylenerhodium(I), $C_5H_7O_2Rh(C_2H_4)_2$, the preparation of which is described by Cramer, J. Am. Chem. Soc., 86, 221 (1964). In the first step, this material is reacted with an excess of the ethylenically unsaturated compound identical with the A group to be introduced. This process is described in the above mentioned Cramer Patent 3,502,738; the properties of the product in which A is vinyl fluoride are given in the table. In the second step, the 2,4-pentanedionato group is replaced by a $\pi$-cyclopentadienyl group. The following preparation of $\pi$-cyclopentadienylbis(vinyl fluoride)rhodium is illustrative:

A cylindrical glass reaction vessel of 200 ml. capacity was fitted with a magnetic stirrer bar, blanketed with nitrogen and charged with 44 ml. of tetrahydrofuran. This was chilled to −80° C., and 2.1 g. of cyclopentadiene and 14 ml. of a 1.6 M solution of butyllithium in hexane were added. Finally, 2.1 g. of $C_5H_7O_2Rh(CH_2\!=\!CHF)_2$ was introduced, the reactor was closed, and the solution was allowed to warm to 25° C. during 45 minutes and maintained at that temperature for 45 mintues. Solvent was removed by distillation under vacuum below 25° C., and the product was recovered by sublimation from the residue at a temperature between 45° C. and 75° C. and a pressure of about 0.02 mm. The yield of $$\pi\text{-}C_5H_5Rh(CH_2\!=\!CHF)_2$$

was 1.44 g.

Compounds of this type in which R is other than hydrogen can be prepared by using the appropriate R-substituted cyclopentadiene in place of cyclopentadiene itself in the procedure just described.

Rhodium compounds having mixed A's can be prepared by reaction of (King's) [$(C_2H_4)_2RhCl]_2$ or of (Cramer's) 2,4-pentanedionatodiethylenerhodium with another unsaturated compound as defined for $A^1$ and $A^2$, followed by reaction with an alkali metal or thallium cyclopentadienide, e.g., $$[(C_2H_4)_2RhCl]_2 + CH_2\!=\!CHCl \longrightarrow$$
$$[(C_2H_4)(C_2H_3Cl)RhCl]_2$$
$$\downarrow C_5H_5Na$$
$$C_5H_5Rh(C_2H_4)(C_2H_3Cl)$$

$$C_5H_7O_2Rh(C_2H_4)_2 + CH_2\!=\!CHCl \longrightarrow$$
$$C_5H_7O_2Rh(C_2H_4)(C_2H_3Cl)$$
$$\downarrow C_5H_5Na$$
$$C_5H_5Rh(C_2H_4)(C_2H_3Cl)$$

Di-cyclopentadienorhodium bromide or iodide can be substituted for the chloride used in the above equations.

π-Cyclopentadienyl(1,5 - cyclooctadiene)rhodium(I) is described by Chatt and Venazi, Nature, 177, 852 (1966).

2,4-pentanedionatodipropylenerhodium(I), which can be converted to π-cyclopentadienyldipropylenerhodium(I) by reaction with cyclopentadiene as described above, can be prepared by the method of Cramer, J. Am. Chem. Soc., 89, 4621 (1967). Its preparation is also described in U.S. Patent 3,502,738.

The preparation of π-cyclopentadienyl(ethylene)-(tetrafluoroethylene)rhodium(I), π-$C_5H_5Rh(C_2H_4)(C_2F_4)$, is described by Cramer et al., J. Am. Chem. Soc., 91, 2519 (1969).

Any of the following rhodium compounds, preparable by methods described above, can be used in the process of the invention, and specifically can be substituted for π-cyclopentadienyldiethylenerhodium(I) in the process of Example 1, below, to produce 1,4-hexadiene from ethylene and butadiene:

π-Isopropylcyclopentadienyldiethylenerhodium(I)
π-t-Pentylcyclopentadienyldipropylenerhodium(I)
π-Phenylcyclopentadienyldiethylenerhodium(I)
π-Cyclopentadienylbis(vinyl chloride)rhodium(I)
π-Methylcyclopentadienylbis(vinyl acetate)rhodium(I)
π-Cyclopentadienylbis(allyl propionate)rhodium(I)
π-Methylcyclopentadienylbis(ethyl vinyl ether)rhodium (I)
π-Methylcyclopentadienyldistyrenerhodium(I)
π-Methylcyclopentadienylbis(butyl methacrylate)rhodium (I)
π-Methylcyclopentadienyldiacrylonitrilerhodium(I)
π-Cyclopentadienyl-1,5-hexadienerhodium(I)

THE PROCESS OF THE INVENTION

The process of the invention is carried out by simultaneously contacting ethylene and butadiene in the liquid phase with one of the above-named catalysts either batchwise or continuously, the reactants being supplied separately or as a mixture. More than one catalyst can be used at one time, of course, e.g., $C_5H_5Rh(C_2H_2)_2$, $C_5H_5Rh(C_2H_4)(C_2H_3Cl)$ and $C_5H_5Rh(C_2H_3Cl)_2$ or $C_5H_5Rh(C_2H_4)_2$, $C_5H_5Rh(C_2H_4)(C_3H_6)$ and $C_5H_5Rh(C_3H_6)_2$, but give no advantage.

A liquid phase in the present invention is accomplished by use of a solvent. Choice of a solvent is not critical, but it should be one which is inert to all reactants and products. Operable solvents include water, various types of organic solvents, and mixtures thereof. Examples of operable organic solvents are lower alkanols such as methyl alcohohl, ethyl alcohol, isopropyl alcohol, isobutyl alcohol, and t-pentyl alcohol; ethers such as tetrahydrofuran, 1,2-dimethoxyethane, di(2-ethoxyethyl)ether, ethyl ether, and butyl ether; lower alkanoic acids and their lower alkyl esters such as acetic acid, propionic acid, isovaleric acid, ethyl acetate, methyl isobutyrate, isopropyl butyrate and butyl propionate.

Probably the most critical variable in the process is the temperature, since reaction will not proceed at less than about 35° C. While it will proceed at temperatures as low as 35° C., the temperature can be as high as 250°–300° C. Usually, to insure a practical rate of reaction, a temperature of at least 40° C. is used, and the preferred range is 40–100° C.

Pressure is not critical, and atmospheric, subatmospheric or superatmospheric pressures can be used A convenient method of operation, which has the advantage that special pressure-resistant equipment is not required, is to supply ethylene and butadiene to the catalyst system at pressures of about 0.5–2.0 atmospheres and conduct the process in this pressure range. Another convenient method of operation is to charge the reactants and catalyst to a reactor at ordinary temperatures or lower and at atmospheric pressure or slightly above, close the reactor, heat to the desired temperature, and operate at the autogenous pressure of the system. However, the process is operable at much higher pressures than those reached in the systems just described, e.g., 1000 atmospheres or even higher.

The mole ratio of the ethylene and butadiene employed is not critical. It can be from about 10 to about 0.1, and is usually between about 2 and 0.5. Preferably, an approximately equimolar mixture of the two reactants is used.

The ratio of moles of rhodium compound to total moles of ethylene and butadiene will usually be from about 0.0001 to 0.1, although even a lower amount of rhodium compound can be used as long as it provides catalytic activity. There is no particular advantage in going above a ratio of about 0.1, although the process is still operable if this limit is exceeded.

The rhodium compound used as a catalyst can be supplied to the reaction mixture by adding the compound itself or a complex of the compound with a metal salt such as mercuric chloride. Alternatively, the rhodium compound and the metal salt can be added separately to the reaction mixture. Essentially the same degree of catalytic activity is realized from a given amount of rhodium compound in any of these ways of carrying out the process.

The process is carried out in the presence of a hydrohalic acid, which can be HCl, HBr, or HI. Such acid should be present in amount enough to furnish a total of at least two equivalents and preferably ten or more equivalents, of halide ion per atom of rhodium. At least two equivalents of hydrohalic acid are essential but the excess of halide ion can also be supplied by a halide salt, e.g., sodium chloride, sodium bromide, or sodium iodide. The hydrogen ion concentration in the reaction mixture should be at least about 0.001 M. An upper limit is imposed only by the concentration of hydrohalic acid that is available, but the preferred range is about 0.1 M to 2.0 M.

The desired product of the process, 1,4-hexadiene, can be separated from the other products by conventional methods, such as distillation or preparative-scale gas chromatography.

EMBODIMENTS OF THE INVENTION

The following examples illustrate the process of the invention. In these examples, percentages are by weight.

EXAMPLE 1

(A) A 100-ml. pressure reactor lined with "Hastelloy" C was swept with nitrogen and charged with 0.11 g. of π-$C_5H_5Rh(C_2H_4)_2$ and 10 ml. of a 0.1 M solution of HCl in ethanol. The reactor was closed, chilled to −80° C., and evacuated. Then 10 g. of ethylene and 20 g. of butadiene were admitted from cylinders containing the compressed gases. The pressure vessel was attached to a reciprocating shaking apparatus and heated at 75° C. for 16 hours. It was cooled to 0° C., and volatile materials were released at atmospheric pressure. The residual redorange liquid was washed with concentrated aqueous $CaCl_2$ and stored over anhydrous $CaCl_2$ to remove alcohol. The mixed-hydrocarbon product weighed 26.7 g. According to analysis by gas chromatography it contained 23% 1,4-hexadiene.

(B) When A was essentially repeated, but at 39–42° C. instead of 75° C., there was obtained 16.6 g. of a paleorange hydrocarbon mixture. Analysis by gas chromatography indicated that it contained 71% 1,4-hexadiene.

(C) When A was again essentially repeated, but with 0.14 g. of mercuric chloride (equivalent to the 0.11 g. of rhodium compound), there was obtained 10.2 g. of a hydrocarbon mixture, indicated by gas chromatography to contain 73% 1,4-hexadiene.

(D) When preformed π-$C_5H_5Rh(C_2H_4)_2 \cdot HgCl_2$ was used in place of the two separate components, there was obtained 25 g. of a hydrocarbon mixture with an indicated 1,4-hexadiene content of 54%.

EXAMPLE 2

Example 1 was essentially repeated with the substitution of 0.11 g. $\pi$-C$_5$H$_5$Rh(CH$_2$=CHF)$_2$ for the $$\pi\text{-C}_5\text{H}_5\text{Rh}(\text{C}_2\text{H}_4)_2$$

Gas chromatographic analysis of the 12.9 g. of product showed that 75% of 1,4-hexadiene, 10% of 2,4-hexadiene was formed along with 15% of C$_8$ and C$_{10}$ olefins.

EXAMPLE 3

Example 1 was essentially repeated, except for the substitution of 0.11 of $\pi$-C$_5$H$_5$Rh(1,5-cyclooctadiene) as the catalyst. Reaction at 75° C. for 16 hours yielded 10.3 g. of hydrocarbon product. Gas chromatographic analysis showed 56% of 1,4-hexadiene, 27% of 2,4-hexadiene and 17% of C$_{10}$ and C$_8$ olefins.

EXAMPLE 4

A run essentially as in Example 1, except for the use of 0.11 g. of $\pi$-C$_5$H$_5$Rh(C$_3$H$_6$)$_2$ as catalyst, yielded 17.3 g. of product. Gas chromatographic analysis showed this consisted of 76% of 1,4-hexadiene, 17% of 2,4-hexadiene and 7% of C$_8$ and C$_{10}$ olefins.

EXAMPLE 5

A run essentially as in Example 1, except for the use of 0.11 g. of $\pi$-C$_5$H$_5$Rh(C$_2$H$_4$)(C$_2$F$_4$) as catalyst, yielded 21.1 g. of product. Gas chromatographic analysis showed this consisted of 74% of 1,4-hexadiene, 18% of 2,4-hexadiene, and 8% of C$_8$ and C$_{10}$ olefins.

Since obvious modifications and equivalents in the invention will be evident to those skilled in the chemical arts, we propose to be bound solely by the appended claims.

The embodiments of the invention in which an exclusive property or privilege is claimed are defined as follows:

1. The process of preparing 1,4-hexadiene which comprises reacting together,
at a temperature in the range between at least about 35° C. and 300° C.,
ethylene and butadiene
in the presence of a hydrohalic acid and a catalytic amount of a rhodium catalyst of the formula $$\pi\text{-RC}_5\text{H}_4\text{RhA}^1\text{A}^2$$

wherein:

R is hydrogen, lower alkyl (of up to 6 carbons), or phenyl;
Rh is rhodium(I); and
A$^1$ and A$^2$ are molecules and may be (1), taken separately and alike or different, ethylene, propylene, vinyl fluoride, vinyl chloride, vinyl lower-alkanoate, allyl lower-alkanoate, vinyl lower-alkyl ether, styrene, lower-alkyl acrylate, or acrylonitrile, each molecule being coordinated to rhodium through its carbon-carbon double bond, or (2), taken together, 1,5-hexadiene or 1,5-cyclooctadiene, the molecule being coordinated to rhodium through both double bonds.

2. The process of claim 1 wherein the temperature is about 40–100° C.

3. The process of claim 1 accomplished in an inert solvent.

4. The process of claim 3 wherein the polar solvent is an alcohol.

5. The process of claim 3 wherein the catalyst is $\pi$-C$_5$H$_5$Rh(C$_2$H$_4$)$_2$.

6. The process of claim 3 wherein the catalyst is $\pi$-C$_5$H$_5$Rh(CH$_2$=CHF)$_2$.

7. The process of claim 3 wherein the catalyst is $\pi$-C$_5$H$_5$Rh(1,5-cyclooctadiene).

8. The process of claim 3 wherein the catalyst is $\pi$-C$_5$H$_5$Rh(C$_3$H$_6$)$_2$.

9. The process of claim 3 wherein the catalyst is $\pi$-C$_5$H$_5$(C$_2$H$_4$)(C$_2$F$_4$).

10. The process of claim 1 in which the rhodium catalyst is supplied as a complex with mercuric chloride.

References Cited

UNITED STATES PATENTS 3,502,738   3/1970   Cramer _____ 260—680

OTHER REFERENCES

Cramer, J. Am. Chem. Soc., 89 (1967) pp. 1633–1639.

PAUL M. COUGHLAN, Jr., Primary Examiner

U.S. Cl. X.R.

252—429 R; 260—429 R, 429 CY